Patented Jan. 5, 1937

2,066,857

UNITED STATES PATENT OFFICE 2,066,857

RESINOUS ADHESIVE AND PROCESS OF MAKING THE SAME

Charles E. Rozema, Grand Rapids, and Jacob H. Tigelaar, Jamestown, Mich., assignors, by mesne assignments, to Reconstruction Finance Corporation, a Federal corporation No Drawing. Application October 18, 1933, Serial No. 694,054

2 Claims. (Cl. 134—26)

Generally speaking, the present invention may be said to have for its object to produce an improved adhesive whose base consists in whole or in part of artificial resin and to provide a simple and novel method for producing such an adhesive.

Heretofore the process of manufacturing a satisfactory adhesive of the artificial resin type for use in laminating more or less porous materials, such as wood, has required many hours, often eight or more. One of the objects of our invention is to make it possible to produce in a much shorter time, say two hours or less, a resinous adhesive which may be handled in the same manner as the commonly known resinous and other adhesives to provide a bond of equivalent strength and durability.

Heretofore it has been necessary to resort to grinding or treatment in colloid mills at some stage in the process of manufacturing a successful adhesive of the synthetic resin type. A further object of our invention is entirely to eliminate the need for such milling and grinding, thus greatly simplifying, quickening and reducing the cost of the entire process.

Another object of our invention is to bring about other reductions in the cost of manufacture by making it possible to use relatively inexpensive materials and appliances and by doing away with the need of supervision by highly skilled or technically trained workmen in the process of manufacture. Thus, by our invention crude phenolic bodies may be combined with equal or lesser quantities of formaldehyde in a reaction vessel such as a common cast-iron glue mixing kettle which may or may not be covered, and which is provided with a jacket to conduct heated or cooled water around the mixer's walls. Also, the exacting control heretofore deemed indispensable is not required in practicing our method and the work may therefore be done by less highly trained men than heretofore.

We are aware of the availability of adhesives containing both synthetic resins and proteinous or albuminous materials; and that in the manufacture of such, grinding of parts or the whole is required and/or pre-treatment of the proteinous material, as solution, partial hydrolysis by cooking, etc. A still further object of our invention is to render unnecessary all of this mechanical and chemical processing in the manufacture of these latter types of adhesives, thus simplifying, quickening and making less costly the process of manufacture.

By our invention a considerable part of the resinous adhesive may be displaced by non-resinous materials such as casein or soya bean meal which apparently effect a combination with the reactive resinous portion; and, since the cost of the non-resinous materials is roughly one-half to two-thirds that of the resinous portion, the economy that may be effected by the use of these non-resinous adhesive materials is obvious. Our invention may therefore be said to have for one of its objects to make possible a considerable lowering in the cost of adhesives having all of the desirable properties of the synthetic resin type, through the effective substitution of non-resinous adhesive materials for a considerable portion of the resin in an adhesive that would otherwise be of the all-resin type.

The advantage of a resinous adhesive, especially of the thermo-setting type, over the common hydrophilic colloids as casein, vegetable and animal glues, is generally conceded to reside in their inertness and inherent resistance to decomposition by weathering, excessive moisture, fungi and other factors commonly affecting proteinous bodies. The resin-protein combination herein disclosed and already referred to displays the desired inertness and resistance to decomposition.

In carrying out our invention, we produce a dispersion in a non-solvent of a resin which is still in the initial reaction stage. This material may be concentrated by heating, or it may be diluted through the addition of more of the non-solvent. Ordinarily the non-solvent is water, and we shall therefore refer to the dispersion as an aqueous dispersion.

The preparation of the heat-hardenable resinous component of our adhesives includes a resinification action which is halted in its initial (A) stage, (Baekeland classification,) stably emulsified in a non-solvent, and reacted further into the intermediate (B) stage (Baekeland classification) in this dispersed condition when such further reaction is necessary. In this process we encounter three physical states to which reference is hereinafter made. The watery reaction materials, as phenol and 40 per cent formaldehyde solution, for example, are heated and stirred for a short time in the presence of a catalyst, such as barium hydrate. Resinification is thus initiated and progresses until a varnish-like resin solution is formed. Thus the resin in its initial stage is dissolved in its aqueous medium through the influence of the alkaline catalyst. If excess water, or a catalyst-neutralizing agent be added at this stage, the resin is precipitated out of solution and can only be restored to solution by the use of suitable solvents, such as alcohol. However, if a dispersing agent, say gum arabic, is stirred into the resin solution, and the catalyst neutralized, the resin is converted from a state of solution into an emulsion. That is, tiny masses of viscous resin are dispersed throughout the aqueous medium in which they are no longer soluble. The resin may be further reacted in this emulsified condition by the application of heat to approach the boiling point of the emulsion, aided by the usual appropriate hardening agents if desired, until the emulsified particles are no longer fluid when cool, but are readily deformable by heat and/or pressure. Thus a suspension is formed. In this manner a solution or homogeneous dispersion may first be transformed into an emulsion, or heterogeneous dispersion, and then into a suspension, when it is desired to do so. Many of the dispersed particles are sufficiently small to be classed as emulsoid or suspensoid, depending upon whether they are in the fluid or solid state. The resinous emulsion is an essential component of all of our new products. This emulsion may be used in any of four ways:

(a) By applying it as a film, with or without a paper carrier, dried and "cured" as desired before use;

(b) By heating it to the suspension stage and the definite "cure" required for its successful use alone;

(c) By admixing it with similar resin in the suspension stage already cured in excess of the requirements of (b) above;

(d) By admixing it with soluble proteinous materials.

The preparation of a suitable resin may be performed as follows: A mixture composed of 100 parts of cresylic acid (97-99 per cent), 75 parts of 40 per cent formaldehyde solution, 1 part of lime (catalyst) is placed in a vessel, open or closed, equipped with a stirring apparatus, and surrounded with a jacket to receive cold or hot water or steam. After standing unheated for a few minutes, the mixture is slowly stirred and its temperature brought up to 90° to 95° C. and kept there for a period of from 1½ to 2 hours, depending upon the mass involved. When the mass has reached the consistency of a heavy liquid varnish, 5 to 20 parts of a dispersing agent previously dissolved in water are added. Gum arabic may be used to advantage as the dispersing agent. At this time the resin, of the heat-hardening type, is still in its initial reaction stage and is held in solution by the alkaline catalyst. Then, upon adding a weak acid in an amount slightly greater than that required to neutralize the alkaline catalyst, say about 10 parts of 28% acetic acid, the liquid resin particles are converted into semi-solid particles which remain dispersed in the aqueous medium. This conversion of the resin, taking place in the presence of a dispersing agent, results in an emulsion-like product. That this emulsion is of a colloidal nature is evident from the fact that it may be diluted with additional dispersing medium (water) without precipitation of the resin en masse. To this emulsion other materials may be added, especially phenol, formaldehyde, glycerine, soluble proteins dry or in solution, diatomaceous earth, etc. This emulsion may be concentrated by heating, preferably below its boiling point. Thus there has been created a dispersion of a very reactive resin which is stable, (this stability being maintained even when the concentration of resin approaches 65%,) and which permits of the addition of various materials with a minimum of difficulty.

When it is desired to use the emulsion as an adhesive, it may be applied to the members to be adhered by means of the usual glue-applying equipment. The film of emulsion dries very slowly to a continuous film of resin. Kiln drying quickly reduces the volatile content to the desired extent and/or advances the "cure" of the resin film to the condition desired for bonding under heat and pressure. Generally, the resin in the film, unless kiln-dried, is so fluid when heated under pressure between somewhat porous members that it penetrates said members to the extent of failing to form an adhesive film between them. Although the required manipulation of pressure during the first part of the heating of this very reactive film is obvious, it is more practical from a commercial point of view to modify the resinous film in accordance with the processes hereinafter described.

When an all-resin adhesive not requiring careful drying is desired, as for special cases requiring maximum oil-resistance or elimination of color due to various materials which might otherwise be added, the emulsified resin provides a convenient starting point. Additional heating and stirring, aided if necessary by appropriate hardening agents, such as hexamethylene-tetramine, advances the cure of the resin, causing the particles gradually to lose their plastic character by virtue of condensation and polymerization, until a dispersion of the suspension type is formed. In this condition the particles are solid when cool, but are deformable under heat and pressure, although not to such an extent as to cause excessive penetration into the members being joined. A film of such a suspension dries very rapidly into a layer of tiny solid particles. The preparation of a suspension accurately adjusted as to cure requires careful supervision.

What we believe to be a novel type of adhesive may be produced by mixing some of the resinous emulsion with a resinous suspension which has purposely been cured in excess of that stage required for the use of the suspension alone, yet not completely advanced to the final (C) stage, (Baekeland classification). By adopting this expedient the requisite careful control heretofore found indispensable is no longer necessary.

An especially practical and economical adhesive may be made by the substitution of a proteinous material for a part of the resin in the emulsion described above. By proteinous materials we mean proteinous and albuminous substances, such as casein, hemoglobin, vegetable seed meals and the like which are normally soluble, and preferably coagulable by heat and/or chemical action. No preliminary treatment of the protein, such as partial hydrolysis, is necessary in preparing it for use. It may be used in a dry powdery condition, or it may be dissolved or suspended in a fluid medium, such as water, miscible with the external phase (water) of the resinous emulsion or suspension. The mixing is accomplished readily simply by adding the protein to the agitated aqueous dispersion of resin; or, in case the protein is in solution, the procedure may be reversed. Especially in the case of the emulsion a combination of a considerable part of the protein with the reactive resin appears to occur; while the remainder is intimately intermingled or interdispersed with the resinous component of the mix. It is important to note that usual subsequent mechanical disintegration or milling in a colloid mill is unnecessary in our manufacturing process. The protein-resin mix is not a tacky mass, although both of the chief components exercise adhesive action when subsequently employed in a hot-platen press. The addition of the protein to the resin dispersion may be facilitated by adjusting the acidity according to the nature of the protein. For example, soya bean flour or a solution thereof may be added while the emulsion is quite acid; while for casein the acid should be neutralized with an alkaline solution, such as ammonium hydroxide; and, in the case of blood albumen, the resin dispersion may be either slightly acid, neutral or alkaline, although a smoother mix is obtained when the emulsion is alkaline. The addition of protein has a thickening, probably dehydrating, effect which may be counteracted by the simple expedient of adding water or other solvent or diluent. We have found that by the addition of a small amount of glycerine, say 10 per cent based on the resin content, maintenance of a desired viscosity is facilitated. The amount of protein added is not confined to narrow limits; it must be adjusted according to the cure of the resinous component, and the nature (porosity) of the members to be adhered. As much as 50 parts of protein in 50 parts of an emulsion have been used in the joining of two layers of poplar wood veneer; and 20 parts of protein in 50 parts of an emulsion that was nearly a suspension proved to be equally satisfactory. The chief wetting action is exerted by the resinous component, the protein tending to restrict excessive wetting and penetration while itself forming the bulk of the adhesive film between the joined members. Consequently, in order to meet the various requirements of wetting and penetration of a glue we find that a variation in the ratio of resin to protein is an effective and useful expedient.

It is to be noted that the protein may be added at the very beginning of the reaction producing the resin, or at any stage up to the emulsification of the resin, but the mixing preferably occurs after the emulsification process. It is to be noted further that heating after emulsification and/or the addition of proteins is not necessary, although if such is desired mild heating is not objectionable. Heretofore, heating subsequent to dispersion in a non-solvent has been an essential step. The effect of the proteinous component upon the rate of drying of the resinous component is very marked in that a film of the mix will air dry in less than one hour whereas a film of the emulsion alone requires several days to dry.

Where the time factor is not of importance, the resin emulsion, compounded if desired with a coagulable protein, may be used as a cold-working glue. In this case desiccation and gradual coagulation of the protein occur until a bond of high strength has been formed.

In order to produce a sheet glue, one or more coatings of the resin emulsion may be spread upon thin kraft tissue paper and be then kiln-dried to the proper cure.

In the production of the resin dispersion any heat-hardenable resin suitable for use as an adhesive may be used, although we prefer the phenol-formaldehyde type for reasons of cost and rate of reaction. Any of the phenolic bodies may be employed, carbolic acid and cresylic acid being preferred. The time required to carry out the necessary reaction varies, of course, with the nature of the phenolic material. The same holds true with respect to the aldehydic ingredients whose chief function is to provide reactive methylene groups to effect condensation with the phenol. The ratio of phenol to aldehyde, say carbolic acid to commercial formaldehyde solution, may vary over wide proportions, but for work in reaction vessels not equipped with reflux condensers, ratios of from 2:1 to 4:3 are preferred. If desired, hardening agents such as are commonly employed in the art of resin manufacture, may be added at any suitable stage of the processes herein described. The alkaline catalyst may be any water-soluble alkali or alkali-earth or ammonia compound producing an alkaline solution, the oxides or hydroxides of barium or calcium being preferred. The dispersing agents employed will naturally vary with the resin solutions involved. They may include water-soluble gums, dextrine, soaps, sulfonated oils and other materials recognized as exerting a "protective action" in the preparation of aqueous dispersions. The concentration of dispersing agent, based upon the weight of phenol present, has been successfully varied between 5 and 20 per cent, 7 or 8 per cent of the dispersing agent, gum arabic, generally proving satisfactory. The acid employed to adjust the reaction, especially during the emulsification process, is preferably not of a strong oxidizing nature which might affect the efficiency of the dispersing agent and other added materials. Acetic acid of 28 per cent strength has been found to be quite satisfactory. The quantity of acid required will naturally vary with the acidity of the reacting ingredients and the amount of alkaline catalyst present. Subsequent neutralization of the acid by an alkali may be accomplished by the use of ammonium hydroxide or other suitable alkaline solutions. When their need is evident, plasticizers, such as di-butylphthalate, may be employed in the adhesives.

Our improved adhesives may be applied by any common glue-spreading equipment, such as the brush, compressed air spray, and parallel horizontal roll spreaders. When the adhesive is of the thermo-setting type, the gluing may be accomplished in the usual manner with hydraulic hot presses or in accordance with a newer practice of gluing in stack formation with heating elements distributed throughout the stack. When the adhesive is of the thermo-plastic type, it is quite essential that the source of heat be removed and the joined members cooled below the melting point of the adhesive before being removed from the press. The adhesives herein described provide entirely satisfactory bonds within the pressing time commonly required by resinous adhesives, for example, three plies of $\frac{1}{16}$" wood veneer may be joined in 5 to 7 minutes when under a pressure of 150 lbs. to 300 lbs. per sq. in. and heated at 250° F. to 300° F.

It is not necessary that our improved adhesives be used within a predetermined time after their manufacture, because the working life thereof is of indefinite length. After the adhesives have been applied to the members to be joined, whether of pulp-board or of wood, they are preferably dried by exposure to air at room temperature or heated air in a drying kiln; and after such drying the glue-coated members may be assembled at any convenient time.

We claim:

1. The process of producing an adhesive which comprises heating and stirring a mixture of phenolic and aldehydic resin-forming materials and an alkaline catalyst until there is obtained a liquid varnish-like product from which resinous bodies will separate upon addition of water, adding to such product a previously dissolved dispersing agent, then adding a weak acid somewhat in excess of the amount required to neutralize the catalyst but not sufficient to cause precipitation of the resin, then adding an agent to render the material alkaline, and mixing with the product thus obtained a substantial quantity of blood albumen.

2. The process of producing an adhesive which comprises heating and stirring a mixture of phenolic and aldehydic resin-forming materials and an alkaline catalyst until there is obtained a liquid varnish-like product from which resinous bodies will separate upon addition of water, adding to such product a previously dissolved dispersing agent, then adding a weak acid, somewhat in excess of the amount required to neutralize the catalyst but not sufficient to cause precipitation of the resin, then adding sufficient ammonium hydroxide to render the material alkaline, and then mixing with the product thus obtained a substantial quantity of proteinous adhesive-base material.

CHARLES E. ROZEMA.
JACOB H. TIGELAAR.